Patented Jan. 8, 1952

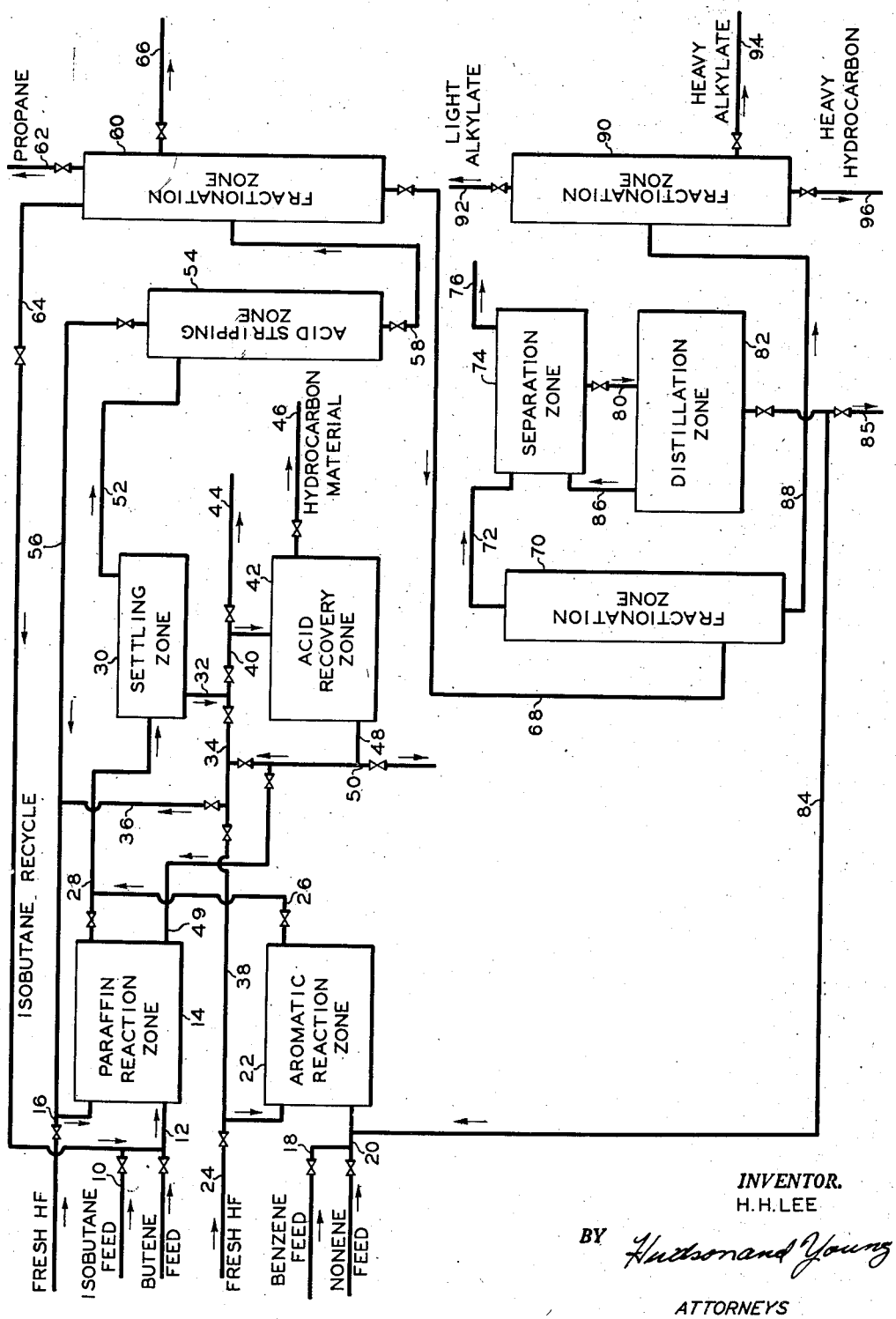

2,582,047

UNITED STATES PATENT OFFICE 2,582,047

COMBINATION ISOPARAFFIN-OLEFIN AND AROMATIC-OLEFIN ALKYLATION PROCESS

Henry H. Lee, Bartlesville, Okla., assignor to Phillips Petroleum Company, a corporation of Delaware Application December 19, 1947, Serial No. 792,699

7 Claims. (Cl. 260—671)

This invention relates to the alkylation of hydrocarbons. In one embodiment it relates to a unitary process for alkylation of paraffinic and aromatic hydrocarbons catalytically. In one specific embodiment this invention relates to an improved method for the separation of emulsified reactor effluents from a paraffin alkylation unit and an aromatic alkylation unit.

It is well known that paraffinic hydrocarbons, particularly isoparaffins, and aromatic hydrocarbons can be alkylated with olefinic hydrocarbons in the presence of alkylation catalyst, such as anhydrous hydrofluoric acid, sulfuric acid, aluminum chloride or the like to produce higher-boiling hydrocarbons.

In fluid catalytic alkylation processes, including both paraffinic and aromatic alkylation, the reactor effluent which is in the form of a hydrocarbon-catalyst emulsion, is passed to a settling tank where it separates into a catalyst phase and a hydrocarbon phase. The hydrocarbon phase which comprises reaction products, unreacted reactants, and usually some dissolved or entrained catalyst is passed to separation equipment for the recovery of desired products and subsequent recycling of unreacted reactant hydrocarbons. The catalyst phase contains in addition to the catalyst, catalyst soluble oils, unreacted reactant hydrocarbons, and minor amounts of light hydrocarbons, such as ethane and propane. All, or a part of the catalyst phase is recycled to the alkylation reactor while a portion may be withdrawn from the system for subsequent purification and return to the system.

I have found that the rate of separation of the reactor effluent hydrocarbon-catalyst emulsion of an aromatic alkylation unit into a hydrocarbon phase and a catalyst phase is slower than the rate of separation of reactor effluent into a hydrocarbon phase and a catalyst phase in a paraffin alkylation unit. Furthermore, the degree of such separation in aromatic alkylation is not as efficient as is desired resulting in the loss of appreciable quantities of reactant hydrocarbons in the catalyst phase.

I have discovered that when the emulsified reactor effluents from a catalytic paraffin alkylation unit and from a catalytic aromatic alkylation unit respectively wherein the alkylation catalyst employed is selected from the group consisting of hydrogen fluoride, sulfuric acid and aluminum chloride are combined and the resulting mixture passed to common settling and separation systems, certain economic and operational advantages are obtained. By combining the emulsified effluents from the paraffin and aromatic alkylation reactors and passing the resulting mixture to a common settler, faster and cleaner separation of the effluent into a hydrocarbon phase and a catalyst phase is obtained than is obtained where the aromatic alkylation effluent is allowed to separate alone. This is due, chiefly to the fact that the density of the hydrocarbon phase from the aromatic alkylation unit is lowered by dilution with the paraffin hydrocarbons. In some cases, aromatic hydrocarbons and products of aromatic alkylation have about the same density as the alkylation catalysts, such as anhydrous hydrogen fluoride. Therefore, the mixing of the reactor effluents from paraffin and aromatic alkylation units tends to decrease the density of the reactor effluent from the aromatic alkylation unit resulting in faster and cleaner phase separation. Also, the lighter paraffin hydrocarbons contained in the paraffin alkylation reactor effluent such as isobutane, exhibit a solvent action on the unreacted aromatic hydrocarbon thereby tending to prevent them from being dissolved in the catalyst phase, particularly when hydrogen fluoride is used as a catalyst. Aromatic hydrocarbons, such as benzene, are quite soluble in hydrogen fluoride. In addition, a common catalyst recovery system can be employed, resulting in a saving in labor, investment and operating expense.

An object of this invention is to provide an improved process for the alkylation of hydrocarbons.

Another object is to provide an improved method for separating the reactor effluents from a catalytic paraffin alkylation unit and a catalytic aromatic alkylation unit.

Still another object is to provide a method whereby the total time for the separation of reactor effluents from a catalytic paraffin alkylation unit and a catalytic aromatic alkylation unit into a catalyst phase and a hydrocarbon phase is reduced.

Another object of my invention is to reduce aromatic hydrocarbon loss due to carry over in catalyst phase.

Other objects and advantages of this invention will be apparent to those skilled in the art from the accompanying disclosure and discussion.

The accompanying drawing is a diagrammatic illustration of an arrangement of apparatus suitable for conducting the process of the present invention. Though I illustrate the process of my invention by using specific feed stocks, such as isobutane and butene, as the reactants in the paraffin hydrocarbon alkylation unit, and benzene and nonene as reactants for the aromatic hydrocarbon alkylation unit, and hydrogen fluoride as the catalyst in each unit, it is to be understood that I am not limited to these materials but that other paraffins, olefins, aromatics and catalysts may be used in my process, as desired.

Referring to the drawing, isobutane feed passes through line 10 to line 12 where it joins butene feed and the resulting mixture is introduced into paraffin reaction zone 14. Fresh hydrogen fluoride, which is used as a catalyst, passes through line 16 to paraffin reaction zone 14, where it is mixed with the isobutane-butene feed. This reaction mixture is maintained under suitable conditions to cause the isobutane to react with the butene in the presence of hydrogen fluoride as the catalyst. Simultaneously with the introduction of isobutane, butene, and hydrogen fluoride into paraffin reaction zone 14, benzene feed is passed through line 18 to line 20 where it is mixed with nonene feed, and the resulting mixture passes through line 20 to aromatic reaction zone 22. Fresh hydrogen fluoride which is used as a catalyst is passed through line 24 to aromatic reaction zone 22 where it is mixed with the benzene-nonene feed. The resulting reaction mixture is maintained under suitable conditions to cause the benzene to react with the nonene in the presence of hydrogen fluoride as the catalyst. The reaction mixture effluent from aromatic reaction zone 22 passes through line 26 to line 28, where it is mixed with the reaction mixture effluent from the paraffin reaction zone 14 which passes through line 28, and the resulting mixture continues through line 28 to settling zone 30. In settling zone 30 the combined reaction mixture effluents from reaction zones 14 and 22 separate by gravity into an acid phase and a hydrocarbon phase. The acid phase which comprises hydrogen fluoride, acid-soluble oils and dissolved hydrocarbons, is removed from acid settling zone 30 through line 32 and is introduced into line 34, where at least a portion of the acid phase is recycled through lines 34, 38 and 24 to aromatic reaction zone 22, and if desirable a portion of said acid phase may be recycled through lines 34, 36 and 16 to paraffin reaction zone 14. As benzene is quite soluble in hydrogen fluoride, returning catalyst phase to paraffin reaction zone 14 would introduce some benzene into reaction zone 14 where it would compete with the isobutane for the butene. In some cases this may be undesirable. Also a portion of the acid phase passes through line 40 to acid recovery zone 42 where the acid catalyst is purified. If desirable, a portion of the acid phase from setttling zone 30 may be removed from the system through line 44. Any hydrocarbon material that is separated from the acid phase in acid recovery zone 42 is removed from the system through line 46. The recovered acid is returned to line 34 through line 48 for further use. If desired, however, this regenerated acid may be returned directly to paraffin reaction zone 14 through lines 48 and 49. However, if desirable, at least a portion of the recovered acid may be removed from the system through line 50.

The hydrocarbon phase from settling zone 30 passes through line 52 to acid stripping zone 54, where dissolved hydrogen fluoride is removed and recycled through line 56. The resulting hydrocarbon phase passes from acid stripping zone 54 through line 58 to a first fractionation zone 60 where the pentanes and lighter are removed. Propane is removed through line 62. Isobutane is removed and is recycled through lines 64, 10 and 12 to paraffin reaction zone 14. Normal butane and pentanes are removed through line 66. The hydrocarbon material boiling higher than pentanes is passed through line 68 to a second fractionation zone 70 where benzene and hexanes are removed through line 72 and are introduced into separating zone 74, where benzene is separated from hexanes by any suitable means, such as by solvent extraction, using a selective solvent for benzene, such as furfural, or by straight fractionation. Where benzene is removed by means of a solvent, such as furfural, the solvent-benzene mixture is passed through line 80 to distillation zone 82, where the benzene is removed and recycled to aromatic reaction zone 22 through lines 84 and 20. If desirable, however, a portion of the benzene may be removed from the system through line 85. The furfural is recycled to separating zone 74 through line 86. Hexanes are removed through line 76. The hydrocarbon material boiling above hexanes is passed through line 88 to a third fractionation zone 90, where it is fractionated into fractions as desired. The light alkylate is removed through line 92, the heavy alkylate is removed through line 94 and heavy hydrocarbon material is removed through line 96. These fractions may be further treated as desired.

In the accompanying diagrammatic drawing reference to some of the equipment such as pumps, gages and the like, which obviously would be necessary to actually operate the process of my invention, have been intentionally omitted. Only sufficient equipment has been shown to illustrate the purpose of my invention, and it is intended that no undue limitations be read into this invention by reference to the drawing and discussion thereof.

In the process of my invention any alkylatable paraffinic hydrocarbon may be used in the paraffin alkylation step but isobutane is particulary suitable and is the paraffin I prefer to use. Also, olefins having at least three and up to and including five carbon atoms per molecule or even more may be used as the olefin in the paraffin alkylation unit but usually I prefer to use butene. In the aromatic alkylation step of my process I may use benzene and mono alkyl benzenes where the alkyl group contains up to and including 16 carbon atoms per molecule; however, I prefer to use benzene as the aromatic hydrocarbon. Also, olefins having at least three and up to and including 16 carbon atoms per molecule may be used in my process; however I prefer to use olefins having not less than 6 and not more than 12 carbon atoms per molecule in the aromatic alkylation unit. These olefins may be obtained from any suitable source, such as from cracked distillates or the like.

The principal advantage of my process is realized only when the same catalyst is used in both the paraffin and aromatic alkylation step, for example if hydrogen fluoride is used in the paraffin alkylation step then hydrogen fluoride should be used in the aromatic alkylation step. Though I may use any suitable fluid alkylation catalyst in my process, such as sulfuric acid, aluminum chloride-hydrocarbon complexes or the like, I prefer to use anhydrous hydrogen fluoride.

The conditions such as temperature, pressure, contact time, etc., used in paraffin alkylation and aromatic alkylation are substantially the same and are well-known in the art. The specific temperature, pressure, contact time, etc., used in each of these alkylation units will depend upon the specific reactants employed. The exact conditions can easily be determined by mere routine test in each case. In general, however, the alkylation of isoparaffins and aromatics with olefins in the presence of alkylation catalysts, such as hydrogen fluoride, is effected at temperatures in the range of from about 0° F. to about 200° F., although a more preferable range is from about 50° F. to about 150° F. The temperature used when other catalysts, such as sulfuric acid, are used may differ from that used where hydrogen fluoride is used as a catalyst. For example, the upper limits of the temperature may be in the order of 125° F., as above that temperature considerable decomposition of the hydrocarbons may be effected due to the action of sulfuric acid. The pressure in the alkylation zone is ordinarily maintained sufficiently high to insure liquid phase operation. The time relationship may be explained by means of the so-called "space time," which is defined as the volume of catalyst within the reaction zone divided by the volume rate per minute of hydrocarbon reactants charged to the zone. Usually the space time will fall within the range of from about 5 to about 80 minutes, although in certain cases it may be desirable to extend this range in either direction. As is well-known in the alkylation art, an excess of alkylatable paraffin and aromatic hydrocarbons over olefins should be maintained in the alkylation zone at all times, e. g. a mol ratio of alkylatable paraffins to olefins and of aromatics to olefins from about 3:1 or 4:1 to about 10:1 or even higher. The reaction mixture effluent from the alkylation zone is passed to an acid settling system where it separates by gravity into a hydrocarbon phase and an acid phase. The time necessary for this settling will vary considerably, depending upon the particular hydrocarbons present, but usually from about 10 to 60 minutes is sufficient for this settling time. According to the process of my invention the total time necessary for the separation of the mixture of the effluents from the paraffin alkylation zone and the aromatic alkylation zone is less than the sum total of time required for separation if the effluent from each of the reaction units was allowed to separate into a hydrocarbon phase and a catalyst phase in separate settling zones. For example, the separation of the effluent from the paraffin alkylation zone into the two phases may take only 20 minutes, whereas the effluent from the aromatic alkylation zone may take 50 minutes, whereas when the effluents from the two reaction zones are mixed and allowed to settle in a common settling zone the time of settling for the total mixture may be only 35 minutes. As pointed out above, this is due chiefly to the lowering of the density of the hydrocarbon phase from the aromatic alkylation zone. The recovery of the so-called spent-acid catalyst, such as spent hydrofluoric acid is conducted in a suitable catalyst recovery system. The recovery of catalyst such as hydrogen fluoride and $H_2SO_4$ is well known in the art. In case of the recovery of hydrogen fluoride in a fractionating system, a temperature in the range of about 250° to about 300° F. or higher is used, depending upon the specific characteristics of the used catalyst material being treated. The temperature at the bottom of the fractionating zone may be maintained at between about 260° and 300° F., but usually it is preferable to use a temperature in the range of about 270° to 280° F. A preferred pressure of about 25 to 50 pounds per square inch absolute is maintained on the bottom of the fractionator; however, if a higher temperature is used than that indicated, a correspondingly higher pressure may be employed. The temperature at the top of the fractionating column may be in the range of about 85° to 150° F., but usually about 95° to about 110° F. is preferable. A pressure in the range of about 20 to about 40 pounds per square inch absolute in the top of the column is usually sufficient for this temperature.

It is to be understood that this invention should not be necessarily limited to the above discussion and description, and that modifications and variations may be made without departing from the invention and from the scope of the claims.

I claim:

1. In a process wherein the concomitant catalytic alkylation of an alkylatable paraffinic hydrocarbon with an olefin, and an aromatic hydrocarbon with an olefin having at least three and not more than sixteen carbon atoms per molecule is carried out in a separate first and a separate second alkylation zone, respectively, and wherein said second alkylation zone is free of the alkylation product of said first zone and wherein the alkylation catalyst is selected from the group consisting of hydrogen fluoride, sulfuric acid and aluminum chloride, the improvement which comprises; combining the emulsified reaction effluent from said first alkylation zone directly with the emulsified reaction effluent from said second alkylation zone; separating the resulting admixture into a catalyst phase and a hydrocarbon phase in a catalyst settling zone; returning a portion of said catalyst phase to said second alkylation zone and returning a portion of said catalyst phase to said first alkylation zone; passing a portion of said catalyst phase to a catalyst recovery zone; returning a portion of said recovered catalyst to said first alkylation zone and a portion to said second alkylation zone.

2. In the process according to claim 1 wherein the catalyst used is hydrogen fluoride.

3. The process according to claim 1 wherein the catalyst used is sulfuric acid.

4. The process according to claim 1 wherein the catalyst used is aluminum chloride.

5. In a process wherein the concomitant hydrogen fluoride catalytic alkylation of isobutane with butene, and benzene with an olefin having at least six and not more than twelve carbon atoms per molecule is carried out in a separate first and a separate second alkylation zone, respectively, and wherein said second alkylation zone is free of the alkylation product of said first zone, the improvement which comprises; combining the emulsified reaction effluent from said first alkylation zone directly with the emulsified reaction mixture effluent from said second alkylation zone; separating the resulting admixture into an acid phase and a hydrocarbon phase in an acid settling zone; returning a portion of said acid phase to said second alkylation zone; passing a portion of said acid phase to an acid recovery zone; removing hydrogen fluoride from said acid phase and returning a portion of said hydrogen fluoride to said first alkylation zone.

6. In a process wherein the concomitant hydrogen fluoride catalytic alkylation of isobutane with butene and benzene with an olefin having at least six and not more than twelve carbon atoms per molecule is carried out in a separate first and a separate second alkylation zone, respectively, and wherein said second alkylation zone is free of the alkylation product of said first zone, the improvement which comprises; combining the emulsified reaction effluent from said first alkylation zone directly with the emulsified reaction effluent from said second alkylation zone; separating the resulting admixture into an acid phase and a hydrocarbon phase in an acid settling zone; returning a portion of said acid phase to said second alkylation zone and returning a portion of said acid phase to said first alkylation zone; passing a portion of said acid phase to an acid recovery zone; removing hydrogen fluoride from said acid phase in said acid recovery zone and returning a portion of said hydrogen fluoride to said first alkylation zone and a portion to said second alkylation zone.

7. In a process wherein the concomitant hydrogen fluoride catalytic alkylation of isobutane with butene, and benzene with an olefin having at least six and not more than twelve carbon atoms per molecule is carried out in a separate first and a separate second alkylation zone, respectively, and wherein said second alkylation zone is free of the alkylated product of said first zone, the improvement which comprises; combining the emulsified reaction effluent from said first alkylation zone directly with the emulsified reaction effluent from said second alkylation zone; separating the resulting admixture into an acid phase and a hydrocarbon phase in an acid settling zone; returning a portion of said acid phase to said second alkylation zone; returning a portion of said acid phase to said first alkylation zone; removing from said hydrocarbon phase a hydrocarbon fraction comprising benzene and hexane; contacting said benzene-hexane fraction with a selected solvent for said benzene in a separating zone whereby a portion of said benzene is dissolved in said solvent; separating said dissolved benzene from said solvent in a distillation zone; returning said benzene from said distillation zone to said second alkylation zone and returning said solvent to said benzene-hexane separating zone.

HENRY H. LEE.

REFERENCES CITED

The following references are of record in the file of this patent:

UNITED STATES PATENTS

| Number | Name | Date |
|---|---|---|
| 2,271,670 | Thomas | Feb. 3, 1942 |
| 2,276,171 | Ewell | Mar. 10, 1942 |
| 2,360,547 | Chenicek | Oct. 17, 1944 |
| 2,394,905 | Frey | Feb. 12, 1946 |
| 2,428,506 | Van der Valk | Oct. 7, 1947 |
| 2,432,482 | Matuszak | Dec. 9, 1947 |
| 2,476,750 | Matuszak | July 19, 1949 |
| 2,510,937 | Tadema | June 6, 1950 |